US010572217B2

(12) United States Patent
Horiyama (10) Patent No.: US 10,572,217 B2
(45) Date of Patent: Feb. 25, 2020

(54) CONTENT PLAYBACK APPARATUS AND CONTROL METHOD THEREOF

(71) Applicant: DENSO TEN Limited, Kobe-shi, Hyogo (JP)

(72) Inventor: Minoru Horiyama, Kobe (JP)

(73) Assignee: DENSO TEN Limited, Kobe-shi (JP)

(*) Notice: Subject to any disclaimer, the term of this patent is extended or adjusted under 35 U.S.C. 154(b) by 0 days.

(21) Appl. No.: 16/134,090

(22) Filed: Sep. 18, 2018

(65) Prior Publication Data
US 2019/0129685 A1 May 2, 2019

(30) Foreign Application Priority Data
Oct. 27, 2017 (JP) .................. 2017-208048

(51) Int. Cl.
| | | |
|---|---|---|
| G06F 16/638 | (2019.01) | |
| G06F 3/16 | (2006.01) | |
| G11B 27/00 | (2006.01) | |
| G06F 3/0482 | (2013.01) | |

(52) U.S. Cl.
CPC ............ *G06F 3/165* (2013.01); *G06F 16/638* (2019.01); *G11B 27/00* (2013.01); *G06F 3/0482* (2013.01)

(58) Field of Classification Search
CPC combination set(s) only.
See application file for complete search history.

(56) References Cited

U.S. PATENT DOCUMENTS

2008/0215169 A1* 9/2008 deBettencourt .. G11B 20/00173
700/94
2012/0207448 A1* 8/2012 Hama ...................... H04N 5/76
386/241

FOREIGN PATENT DOCUMENTS

| JP | 2007-220212 A | 8/2007 |
| JP | 2009-143412 A | 7/2009 |

* cited by examiner

*Primary Examiner* — Walter F Briney, III
(74) *Attorney, Agent, or Firm* — Oliff PLC (57) ABSTRACT

A content playback apparatus that plays back a content of a plurality of contents stored in an external apparatus, includes: a controller that causes content information of a playback target content among the plurality of contents to be displayed on a screen; and a memory that stores information. The controller: i) performs a process of storing a history of a narrowing operation performed to select the playback target content; ii) performs a process of displaying a narrowing condition on which the playback target content is selected by the narrowing operation; and iii) determines whether or not to cause the narrowing condition to be displayed again on the screen of the content playback apparatus, in a case where the playback content apparatus changes from a state in which the content playback apparatus fails to recognize the external apparatus to a state in which the content playback apparatus recognizes the external apparatus.

8 Claims, 10 Drawing Sheets

| MUSIC ID | GENRE | COMPO-SER | PLAYLIST | ARTIST | ALBUM | SONG |
|---|---|---|---|---|---|---|
| ○○○○ | ROCK | MMMM | LIST 1 | AAAA | PPPP | XXXX |
| △△△△ | ROCK | NNNN | LIST 2 | AAAA | PPPP | YYYY |
| ∗∗∗∗ | POP | NNNN | — | CCCC | RRRR | ZZZZ |
| ∗ | ∗ | ∗ | ∗ | ∗ | ∗ | ∗ |
| ∗ | ∗ | ∗ | ∗ | ∗ | ∗ | ∗ |
| ∗ | ∗ | ∗ | ∗ | ∗ | ∗ | ∗ |

CONTENT PLAYBACK APPARATUS AND CONTROL METHOD THEREOF

BACKGROUND OF THE INVENTION

Field of the Invention

The invention relates to a content playback apparatus and a control method thereof.

Description of the Background Art

Conventionally, there has been an audio apparatus that displays, on a display, a category name selected by a user during playback of music stored in a portable audio unit being connected to the audio apparatus. A name of genre, such as rock and pop, and a name of a composer of the music are among examples of the category name.

For example, when an ACC power of a vehicle is turned off, the user can operate the portable audio unit freely. However, the audio apparatus cannot detect a user operation made during a state in which the ACC power of the vehicle is off (hereinafter also referred to as "turn-off of the ACC"). Therefore, when the ACC power of the vehicle is turned on again after turn-off of the ACC, displaying, on the audio apparatus, the category name selected by the user before the ACC power was turned off may be inappropriate. However, since the audio apparatus cannot detect the user operation during the turn-off of the ACC when the ACC is turned on again, if the category name is not displayed on the audio apparatus, it may be inconvenient for the user.

SUMMARY OF THE INVENTION

According to one aspect of the invention, a content playback apparatus that plays back a content of a plurality of contents stored in an external apparatus, includes: a controller that causes content information of a playback target content among the plurality of contents to be displayed on a screen of the content playback apparatus; and a memory that stores information. The controller: i) performs a process of storing, as history information into the memory, a history of a narrowing operation performed to select the playback target content; ii) performs a process of displaying, on the screen of the content playback apparatus, a narrowing condition on which the playback target content is selected by the narrowing operation; and iii) determines, based on the history information stored in the memory and the content information of the content being selected in the external apparatus among the plurality of contents, whether or not to cause the narrowing condition to be displayed again on the screen of the content playback apparatus, in a case where the playback content apparatus changes from a state in which the content playback apparatus fails to recognize the external apparatus to a state in which the content playback apparatus recognizes the external apparatus.

Thus, it is possible to improve usability for a user.

According to another aspect of the invention, the controller: performs a process of acquiring the content information stored in the external apparatus, and storing the acquired content information, as a database, into the memory; and in a case where the controller determines that there is another item to which the narrowing condition can be changed, when causing the narrowing condition to be displayed, causes a mark to be displayed on the screen of the content playback apparatus. The mark shows that there is the another item that is selectable. The narrowing condition is displayed based on the database.

Thus, since a mark is displayed that shows there is another item to which the narrowing condition can be changed, it is possible to improve usability for the user.

Therefore, an object of the invention is to improve usability of a content playback apparatus that plays back contents stored in an external apparatus.

These and other objects, features, aspects and advantages of the invention will become more apparent from the following detailed description of the invention when taken in conjunction with the accompanying drawings.

DESCRIPTION OF THE EMBODIMENTS

An embodiment of the invention will be described below with reference to the drawings.

<1. Content Playback System>

Figure 1:
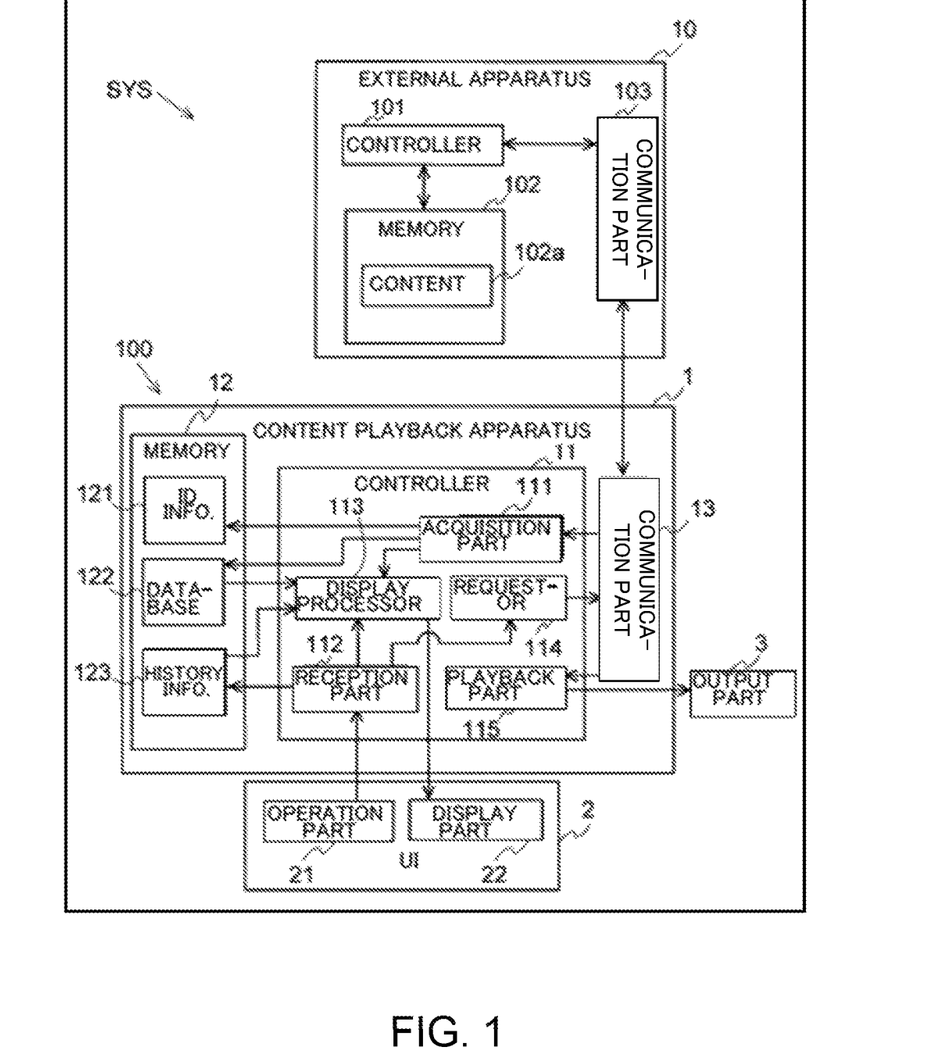
FIG. 1 illustrates a block diagram that shows a configuration of a content playback system of this embodiment.

FIG. 1 illustrates a block diagram that shows a configuration of a content playback system SYS of this embodiment. As shown in FIG. 1, the content playback system SYS includes a content playback apparatus 1 and an external apparatus 10. The content playback apparatus 1 and the external apparatus 10 area communicably connected to each other. The content playback apparatus 1 may be connected to the external apparatus 10 by wire or wirelessly. Moreover, the external apparatus 10 may be directly inserted to a connection slot of the content playback apparatus 1.

The external apparatus 10 is terminal equipment, for example, a smartphone, a notebook personal computer (PC), a tablet device, a mobile phone, a personal digital assistant (PDA), and a wearable device.

The external apparatus 10 includes a controller 101, a memory 102, and a communication part 103. The controller 101 controls the entire external apparatus 10. The memory 102 is a storage device, such as a non-volatile memory and a register. The memory 102 stores a content 102a. The memory 102 is capable of storing a plurality of the contents 102a. The contents 102a of this embodiment are music (songs). However, the contents 102a may be information that is played back as images, for example, a motion picture, such as a movie and a recorded lecture at a university, and a still image, such as a picture. The contents 102a may be information that is played back as sound other than music. The controller 101 executes a playback of the contents 102a. The communication part 103 is a communication device, and sends and receives data to/from the content playback apparatus 1.

The content playback apparatus 1 is provided so as to play back the contents stored in the external apparatus 10. In this embodiment, the content playback apparatus 1 is installed in a car navigation apparatus 100. The content playback apparatus 1 is installed so as to play back music. However, the content playback apparatus 1 may be installed in an audio player, an optical disk player, or another electronic apparatus including a function of playing back the contents, other than the car navigation apparatus. Details of the content playback apparatus 1 will be described later.

As shown in FIG. 1, the car navigation apparatus 100 includes a user interface 2 (hereinafter "UI 2") and an output part 3 besides the content playback apparatus 1. The UI 2 includes an operation part 21 and a display part 22.

The operation part 21 is operated by a user to give an instruction to the content playback apparatus 1. The operation part 21 may include at least one of, for example, a touch panel, an operation button, an operation lever and an operation dial. The operation part 21 may be a remote controller for a remote operation.

The display part 22 includes a display screen having, for example, a liquid crystal display. In addition to car navigation information, music information of the music that is played back by the content playback apparatus 1 is displayed on the display part 22. The music information includes a music (hereinafter, referred also to as "song") title, an album title including the music, and a name of an artist who plays the music. In this embodiment, the display part 22 includes a touch panel function. In other words, the display part 22 at least partially functions as the operation part 21.

The output part 3 outputs, to the user, playback information of the contents 102a that is played back by the content playback apparatus 1. In this embodiment, the output part 3 includes a loudspeaker. The output part 3 outputs the music played back by the content playback apparatus 1, as sound. In a case where the content played back by the content playback apparatus 1 is a video, the output part 3 may be a display apparatus. In this case, the display part 22 may play a role of an output part.

<2. Content Playback Apparatus>

As shown in FIG. 1, the content playback apparatus 1 includes a controller 11, a memory 12, and a communication part 13. The controller 11 includes an acquisition part 111, a reception part 112, a display processor 113, a requestor 114, and a playback part 115. The memory 12 stores information. More specifically, the memory 12 stores identification information 121, a database 122, and history information 123. The communication part 13 is a communication device that enables the content playback apparatus 1 to send and receive data to/from the external apparatus 10.

The content playback apparatus 1 includes various types of circuits and a computer that has, for example, a central processing unit (CPU), a read only memory (ROM), a random access memory (RAM), a hard disk drive (HDD) and input/output ports. The CPU of the computer functions as the acquisition part 111, the reception pare 112, the display processor 113, the requestor 114, and the playback part 115 by, for example, reading out and executing programs stored in ROM.

At least one or all of the acquisition part 111, the reception part 112, the display processor 113, the requestor 114, the playback part 115 of the controller 11 may be configured by a hardware, such as an application specific integrated circuit (ASIC) and a field programmable gate array (FPGA). Moreover, the acquisition part 111, the reception part 112, the display processor 113, the requestor 114 and the playback part 115 are conceptual configuration elements. A function executed by one of the configuration elements may be distributed to two or more configuration elements, or functions of a plurality of the configuration elements may be integrated into one configuration element.

The memory 12 is, for example, the RAM or the HDD. The RAM or the HDD stores the identification information 121, the database 122, and the history information 123. The memory 12 may be configured by a portable memory medium, such as a SD memory card (registered trademark) and a universal serial bus (USB) memory. Moreover, the content playback apparatus 1 may acquire the foregoing program and information via a computer and a portable memory medium that are connected to a wired network or a wireless network.

The acquisition part 111 acquires the information from the external apparatus 10. In this embodiment, once recognizing the external apparatus 10, the acquisition part 111 automatically acquires a part of information from the external apparatus 10. The content playback apparatus 1 recognizes the external apparatus 10, for example, when the external apparatus 10 gets connected to the content playback apparatus 1, or when a power of the content playback apparatus 1 is turned on from the turn off while being connected to the external apparatus 10. In this embodiment, the content playback apparatus 1 is included in the car navigation apparatus 100, so that when an ACC of a vehicle is changed to ON from OFF, the content playback apparatus 1 recognizes the external apparatus 10.

Once recognizing the external apparatus 10, the acquisition part 111 acquires, from the external apparatus 10, the identification information 121 that each external apparatus 10 has. The identification information 121 may be information to discriminate the external apparatuses 10 from one another, and a style of the identification information 121 is not specifically limited. The identification information 121 may be a serial number or the like that is given to each external apparatus 10 in a production process of the external apparatus 10. In this embodiment, only when the identification information 121 acquired by the acquisition part 111 this time is different from the identification information 121 already stored in the memory 12, the acquisition part 111 stores, into the memory 12, the identification information 121 of the external apparatus 10 to replace the identification information 121 already stored in the memory 12 with the identification information 121 acquired this time. However, whenever the acquisition part 111 acquires the identification information 121 from the external apparatus 10, the acquisition part 111 may store the identification information 121 into the memory 12. In other words, the identification information 121 of the external apparatus 10 connected to the content playback apparatus 1 is stored in the memory 12.

The controller 11 performs a process of acquiring information of the contents 102a stored in the external apparatus 10 and storing the information into the memory 12 as the database 122. In this embodiment, the acquisition part 111 performs a process of building the database 122. More specifically, once recognizing the external apparatus 10, the acquisition part 111 automatically acquires the information of the contents 102a from the external apparatus 10. In a case where a plurality of the contents 102a are stored in the memory 102 of the external apparatus 10, the acquisition part 111 acquires the information of the plurality of contents 102a.

In this embodiment, the acquisition part 111 acquires information of music stored in the memory 102 of the external apparatus 10, and stores the acquired information of the music in the memory 102 as the database 122. The music database 122 includes a wide range of the music information, such as a music ID that is unique to the music, a music title, an album title including the music, an artist name, a genre name, and a composer name of the music.

The reception part 112 receives an instruction of the user via the operation part 21. The reception part 112 properly notifies the display processor 113 and the requestor 114 of the instruction that the reception part 112 has received from the user. In this embodiment, the operation part 21 includes the touch panel of the display part 22. The reception part 112 receives the instruction of the user made with the touch panel, and notifies the display processor 113 and the like of the instruction of the user.

The controller 11 performs a process of storing, into the memory 12, a history of a narrowing operation made to select a content to be played back (hereinafter "playback target content"), as history information. In this embodiment, the storing process is performed by the reception part 112. The playback target contents herein include the contents 102a stored in the external apparatus 10. Moreover, the narrowing operation to select the playback target content from the contents 102a is made by the user with the operation part 21. Details of narrowing the contents 102a will be described later.

The controller 11 causes the information of the playback target contents to be displayed on the screen. In this embodiment, this display process is performed by the display processor 113. The information of the contents to be displayed on the screen includes a plurality of sorts of information hierarchically categorized. The contents 102a stored in the external apparatus 10 can be the playback target contents. The information of the contents 102a is displayed on the screen of the display part 22. The display processor 113 controls the display part 22. In other words, the display part 22 displays the information and the like on the screen in accordance with an instruction of the display processor 113. In this embodiment, the display processor 113 causes information (e.g., operation keys, etc.) that is necessary for the user to select the playback target contents 102a, to be displayed on the screen.

In this embodiment, the display processor 113 performs the display process of displaying, for example, the information necessary for the user to select music stored in the external apparatus 10 and the information of the playback target music. Once recognizing the external apparatus 10, the display processor 113 automatically performs the display process of displaying the information necessary for the user to select music stored in the external apparatus 10. However, the display process of displaying the information necessary for the user to select music stored in the external apparatus 10 may be started by an instruction of the user made with the operation part 21.

Figure 2:
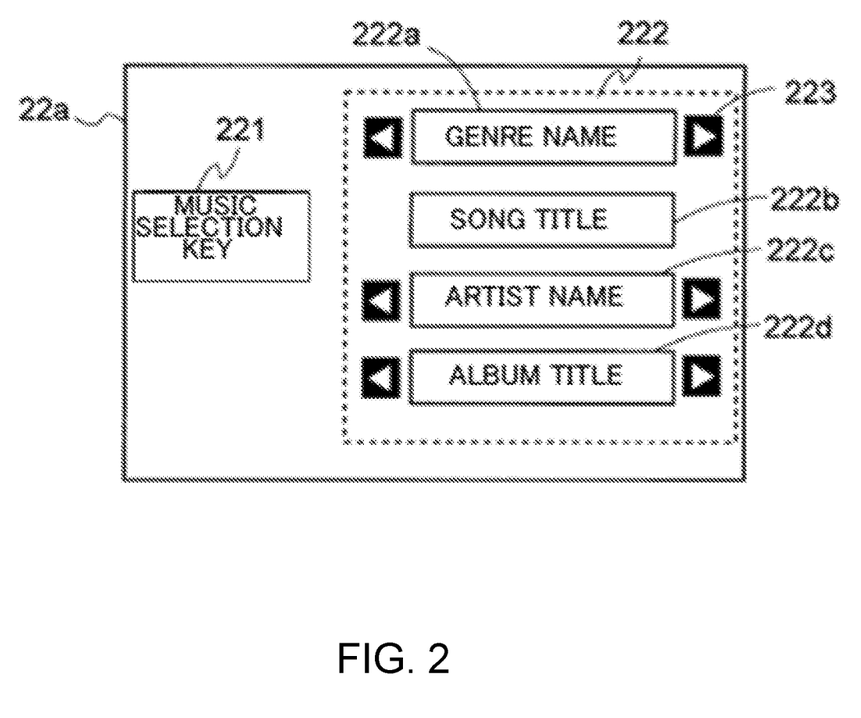
FIG. 2 illustrates a schematic diagram of a screen that is displayed by an instruction of a display processor.

FIG. 2 illustrates a schematic diagram of a screen 22a that is displayed by the instruction of the display processor 113. As shown in FIG. 2, a music selection key 221 that is used to select music to be played back is displayed on the screen 22a. In this embodiment, the music selection key 221 is an operation key on the touch panel. The screen 22a includes a music information display region 222 in which the information of the playback target music is displayed. The music information display region 222 includes: a category name display area 222a in which a category name is displayed; a song title display area 222b in which a song title is displayed; an artist name display area 222c in which an artist name is displayed; and an album title display area 222d in which an album title is displayed.

The category name is an example of narrowing conditions that are used for the narrowing operation of this embodiment to select the playback target content that can be displayed on the screen if being selected by the narrowing operation. In this embodiment, the category name (narrowing condition) is hierarchically categorized highest information relating to the contents among information in a plurality of categories.

There are a plurality of selectable conditions as the narrowing condition. At least one of the genre name, the composer name and the playlist name of the content may be included in the selectable conditions. Thus, the information to be hierarchically categorized of the contents can be categorized in an easy-to-understand manner for the user. In this embodiment, the category names (narrowing conditions) are the genre name, the composer name, and the playlist name. The category name is not displayed on the screen 22a, in principle, unless the user selects the category name. The playlist is a list that is prepared by the user to define an order to play back the contents.

Figure 3:
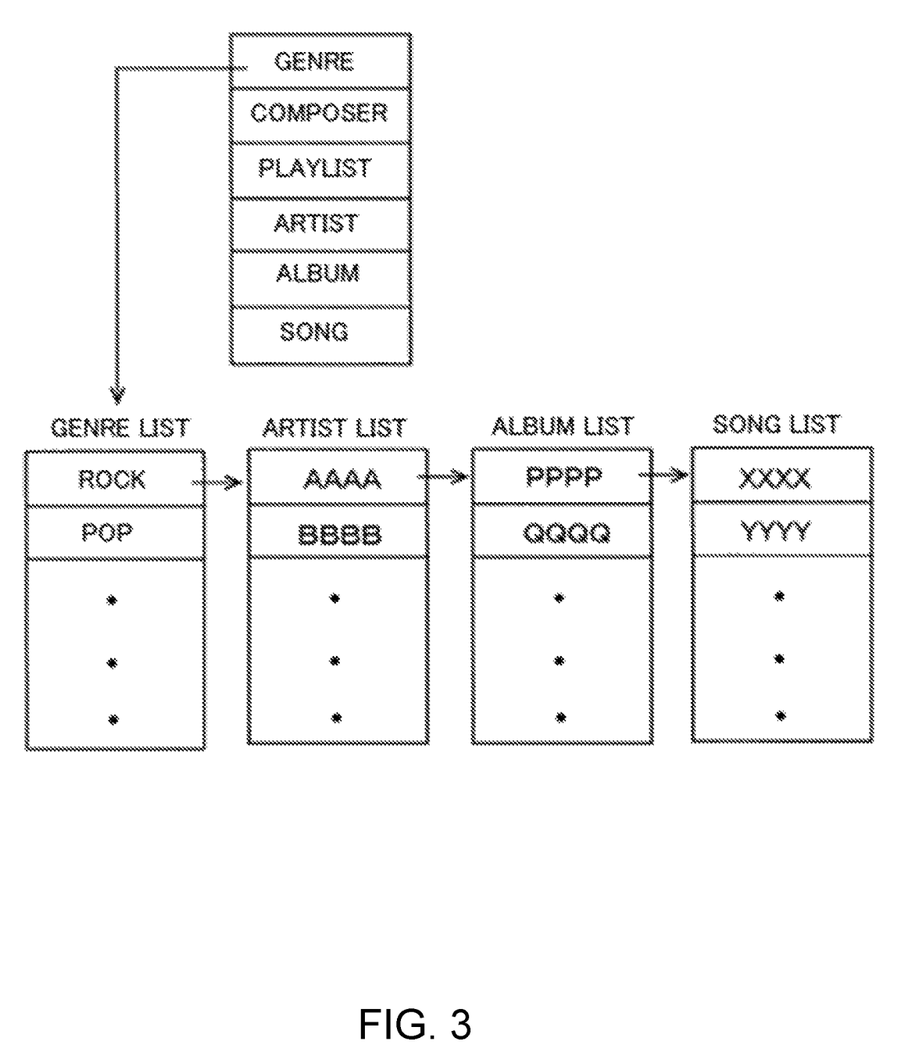
FIG. 3 is a schematic diagram illustrating a narrowing operation to select contents in an external apparatus.

FIG. 3 is a schematic diagram illustrating the narrowing operation to select the contents 102a in the external apparatus 10. Once the user presses the music selection key 221, the plurality of categories to select music is displayed on the screen 22a. In this embodiment, once the user presses the music selection key 221, "Genre," "Composer," "Playlist," "Artist," "Album," and "Song" are displayed on the screen 22a. The user selects one or more of the conditions displayed on the screen 22a to narrow music.

The "Genre," the "Composer," and the "Playlist" are selectable as the category name. However, the "Artist," the "Album," and the "Song" cannot be selected as the category name because the "Artist," the "Album," and the "Song" are displayed in the music title display area 222b, the artist name display area 222c, the album title display area 222d of the music information display region 222, respectively, without user's selection. For example, if the artist name display area 222c and the album title display area 222d are not included in the music information display region 222, the "Artist" and the "Album" may be selected as the category name.

As shown in FIG. 3, once the user selects the "Genre," a list of the genre names selectable by the user is displayed on the screen 22a. For example, when the user selects the "Rock" as the genre name, a list of names, selectable by the user, of rock artists who play rock is displayed on the screen 22a. For example, when the user selects "AAAA" as the "Artist name," a title list of albums, selectable by the user, each of which includes a plurality of music of the artist "AAAA" is displayed on the screen 22a. For example, when the user selects "PPPP" as the "Album title," a title list of songs, selectable by the user, included in the album "PPPP" is displayed on the screen 22a. A song having a music title selected by the user from the name list of songs becomes the playback target music.

As described above, the reception part 112 stores, into the memory 12, as the history information 123, the history of the narrowing operation made by the user to narrow the contents (music in this embodiment). In the example shown in FIG. 3, the reception part 112 stores, as the history information into the memory 12, the history of the narrowing operation made by the user in order of the "Genre," the "Rock," the "Artist name," and then the "Album title" to narrow the contents. The song title finally selected by the user may also be stored as the history information 123.

Figure 4:
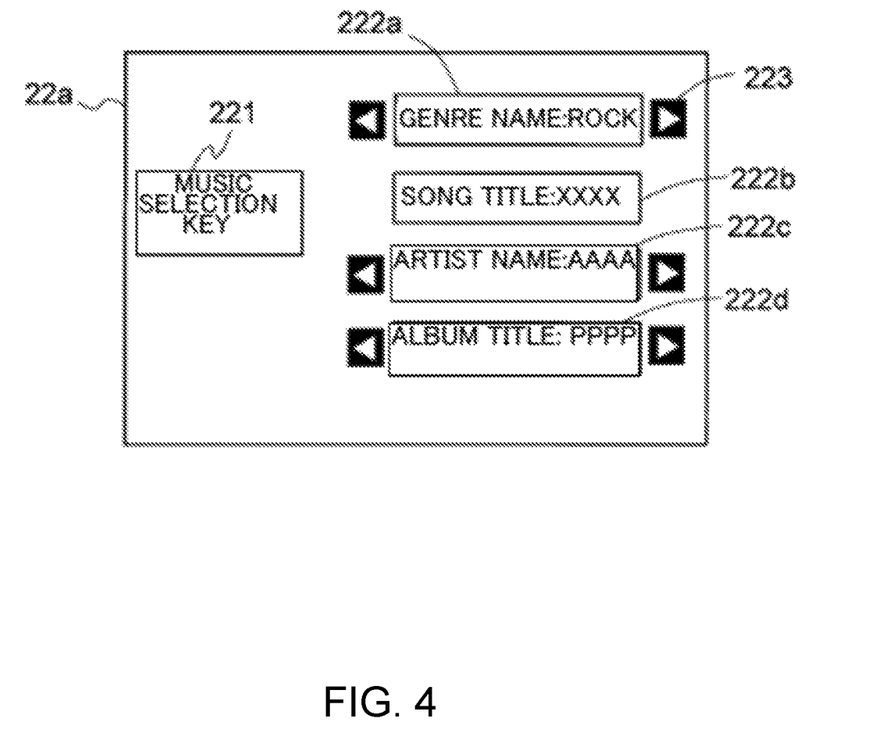
FIG. 4 is a schematic diagram illustrating an example of a screen showing information of playback target music.

FIG. 4 is a schematic diagram illustrating an example of the screen 22a showing the information of the playback target music. FIG. 4 illustrates the screen 22a displayed when the user has selected the song title "XXXX" by the narrowing operation explained with reference to FIG. 3.

Since the user has selected the "Genre," the genre name is displayed in the category name display area 222a, as shown in FIG. 4. More specifically, the "Rock" is displayed, as the genre name of the playback target music, in the category name display area 222a. The song title "XXXX" is displayed, as the title of the playback target music, in the music title display area 222b. The artist name "AAAA" is displayed, as the name of the artist who plays the playback target music, in the artist name display area 222c. The album title "PPPP" is displayed, as the album title including the playback target music, in the album title display area 222d.

In the example shown in FIG. 4, a mark 223 is displayed on the screen 22a that shows the music information. The mark 223 shows that there is another selectable item. More specifically, the marks 223 are displayed next to the category name display area 222a, the artist name display area 222c, and the album title display area 222d, respectively. In this embodiment, the marks 223 displayed next to the category name display area 222a, the artist name display area 222c, and the album title display area 222d also functions as a display change key. The mark 223 will be also referred to as the display change key 223 below.

In this embodiment, the Mark 223 is not displayed next to the music title display area 222b because there is another operation key (not illustrated) to skip music. However, the mark. 223 may be displayed next to the music title display area 222b.

There are two types of the display change key 223 to change a displayed item not only in one order but also in an order opposite to the one order. One type and the other type of the display change key 223 are displayed on a right side and on a left side, respectively, of each of the category name display area 222a, the artist name display area 222c, and the album title display area 222d. However, only one type of the display change key 223 may be displayed.

In an example shown in FIG. 4, the genre name "Rock" is selected as the category name. In a case where a song categorized in a genre other than "Rock" is stored in the memory 102 of the external apparatus 10, the display processor 113 causes the display change key 223 to be displayed next to the category name display area 222a. For example, in a case where a song categorized in the genre name "Pop" (the content 102a) is stored in the memory 102, the display change key 223 is displayed. Once the user operates the display change key 223 by giving a pressure on the screen or by another operation, the genre name is changed from "Rock" to another genre name, such as "Pop."

Figure 5:
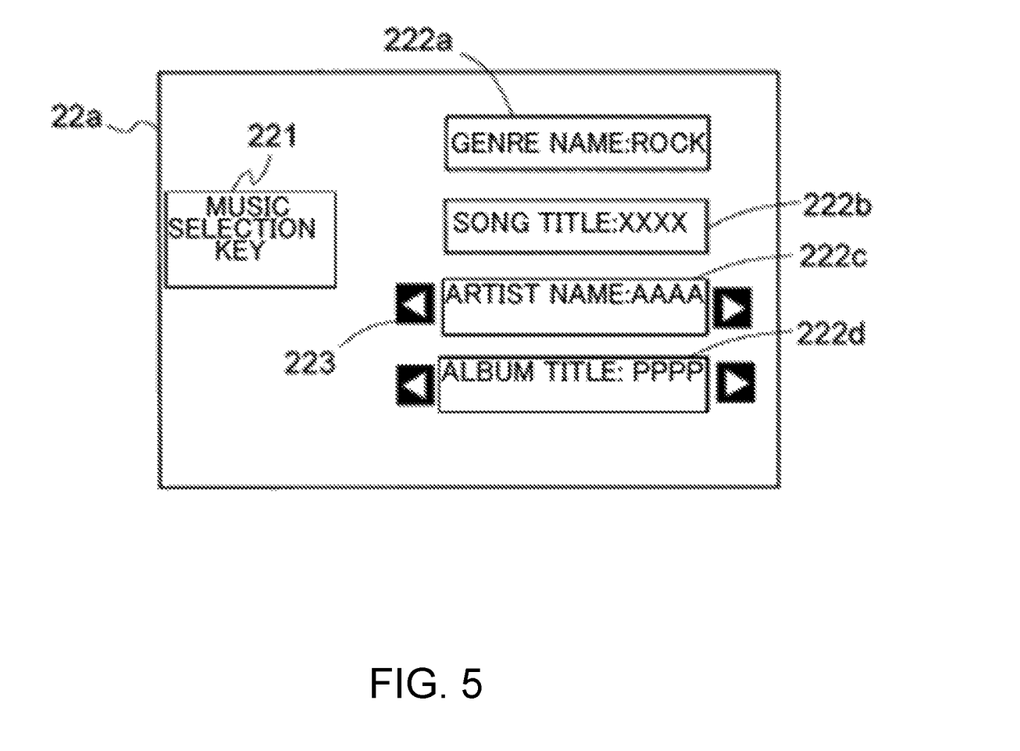
FIG. 5 is a schematic diagram illustrating an example of the screen different from the example shown in FIG. 4.

FIG. 5 is a schematic diagram illustrating an example of the screen different from the example shown in FIG. 4. As shown in FIG. 5, in a case where no song categorized in a genre name other than the genre name "Rock" is stored in the memory 102, the display processor 113 does not cause the display change key 223 to be displayed next to the category name display area 222a.

In the example shown in FIG. 4, in a case where the song that i) is categorized in the genre name "Rock" and ii) is played by an artist other than "AAAA" is stored in the memory 102, the display processor 113 causes the display change key 223 to be displayed next to the artist name display area 222c. In a case where such a song is not stored it the memory 102, the display change key 223 is not displayed next to the artist name display area 222c. In the example shown in FIG. 4, since the genre name "Rock" is being selected, whether or not a changeable artist name exists is determined on a condition that a song played by the changeable artist is categorized as "Rock." For example, in a case where the genre name "Pop" is being selected, whether or not a changeable artist exists is determined on a condition that a song played by the changeable artist is categorized as "Pop."

In the example shown in FIG. 4, the display processor 113 causes the display change key 223 to be displayed next to the album title display area 222d in a case where there is music in the memory 102 that i) is categorized as the genre name "Rock," ii) is categorized in the artist name "AAAA," and iii) is included in an album other than the album title "PPPP." In a case where such music is not stored in the memory 102, the display change key 223 is not displayed next to the album title display area 222d.

In this embodiment, the display processor 113 determines, based on the database 122, whether or not there is a content in a category other than the category narrowed by the user, among the contents 102a stored in the memory 102 of the external apparatus 10. For example, the display processor 113 determines, based on the database 122, whether or not a song categorized in a genre other than the genre name "Rock" is stored in the memory 102.

With reference back to FIG. 1, the requestor 114 sends a demand to the external apparatus 10 via the communication part 13, in accordance with an instruction from the reception part 112. The requestor 114 makes the demand of, for example, playback of the content 102a, in accordance with the instruction from the reception part 112. The playback part 115 receives a playback signal from the external apparatus 10 via the communication part 13; and outputs sound from the output part 3 after performing an equalizer process, an amplification process, and the like set in the content playback apparatus 1, if necessary.

Figure 6:
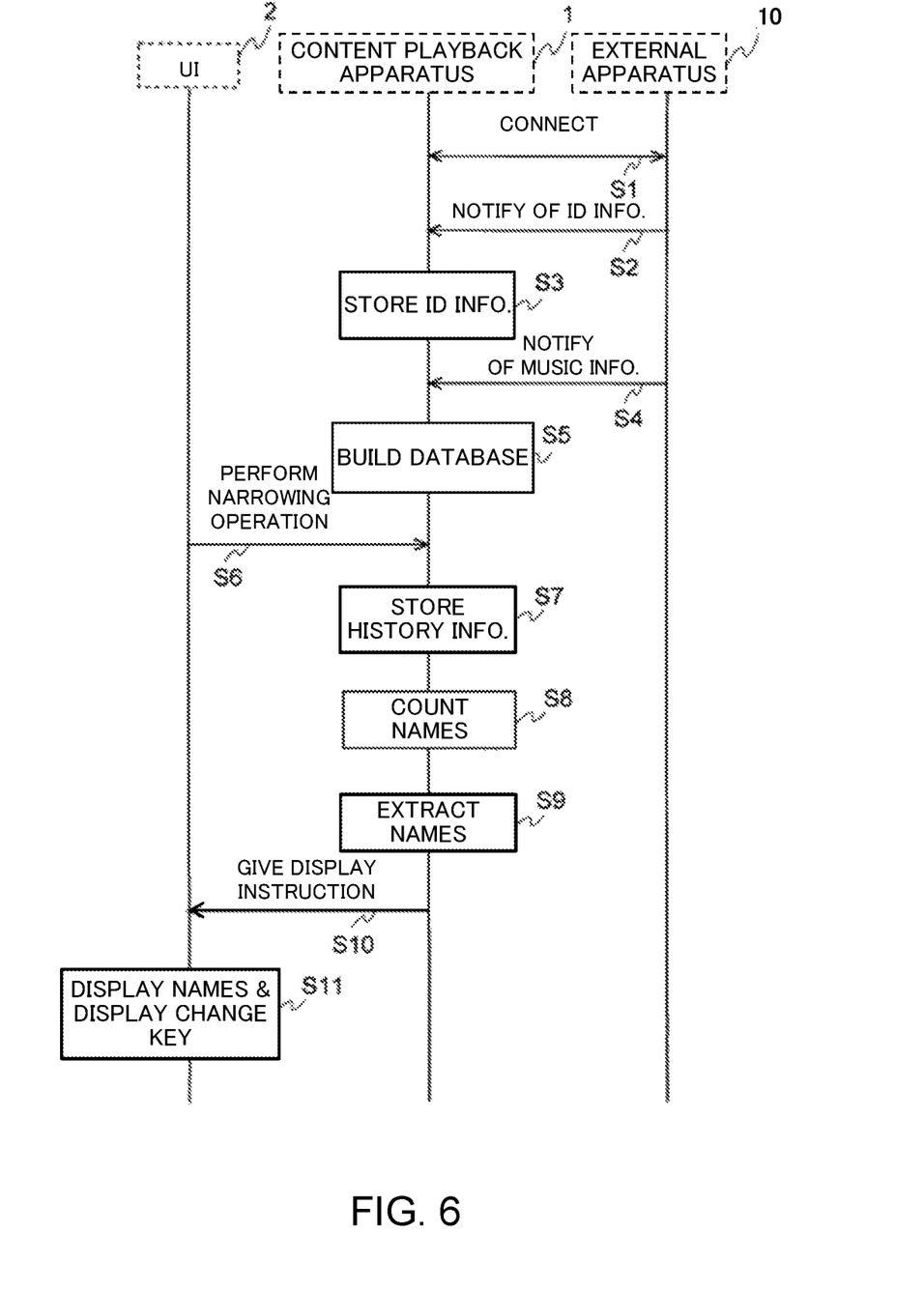
FIG. 6 is a sequence diagram illustrating a procedure of a process that is performed by the content playback system of this embodiment.

FIG. 6 is a sequence diagram illustrating a procedure of a process that is performed by the content playback system SYS of this embodiment. As shown in FIG. 6, the content playback apparatus 1 and the external apparatus 10 get connected to each other by wire or wirelessly (a step S1). Once being connected to the content playback apparatus 1, the external apparatus 10 notifies the content playback apparatus 1 of the identification information 121 (a step S2).

The acquisition part 111 of the content playback apparatus 1 performs the process of storing, into the memory 12, the identification information 121 sent from the external apparatus 10 (a step S3). In this embodiment, only when the identification information 121 acquired this time is different from the identification information 121 previously stored in the memory 12, the acquisition part 111 replaces the identification information 121 previously stored in the memory 12 with the identification information 121 acquired this time. In a case where the identification information 121 acquired this time is the same as the identification information 121 previously stored in the memory 12, the acquisition part 111 does not perform the storing process.

Once being connected to the content playback apparatus 1, the external apparatus 10 notifies the content playback apparatus 1 of the music information stored in the memory 102 of the external apparatus 10 (a step S4). Depending on circumstances, notification of the music information may be performed earlier than notification of the identification information. The external apparatus 10 notifies the content playback apparatus 1 of the music information of all music that can be played back by the content playback apparatus 1 amongst the music information stored in the memory 102.

Figure 7:
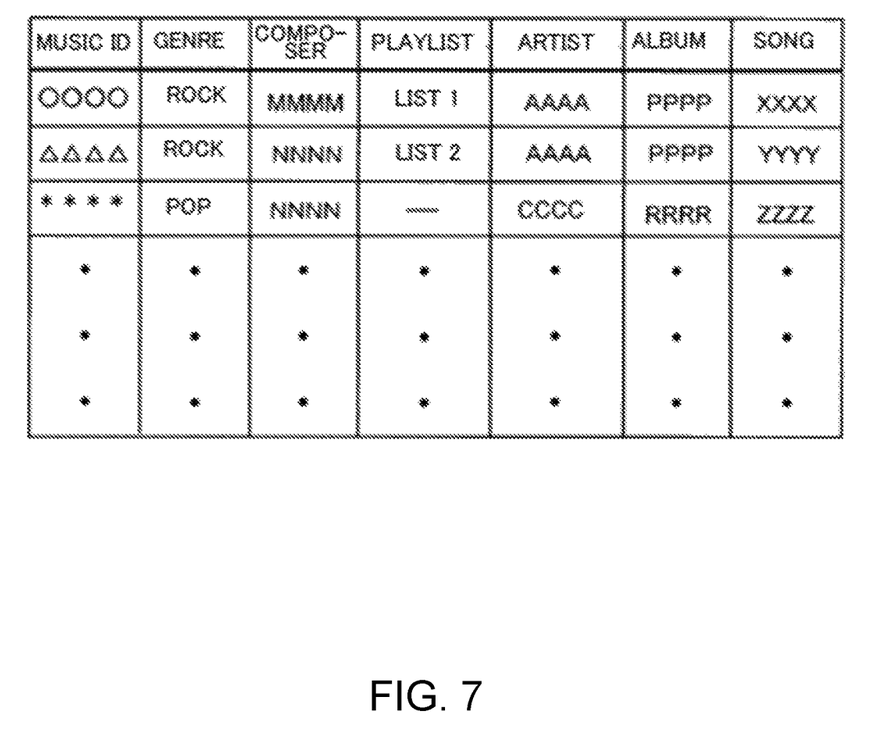
FIG. 7 illustrates an example of a database of music.

The acquisition part 111 stores, as the database 122 into the memory 12, the music information of which the content playback apparatus 1 has been notified from the external apparatus 10 (a step S5). FIG. 7 illustrates an example of the database 122. As shown in FIG. 7, each of music has the music ID. The genre name, the composer name, the playlist name, the artist name, the album title, and the music title are associated with the music ID in the database 122. Depending on music, there is a case in which music has an item that is not associable. For example, a music that is not listed on any playlist cannot be associated with the playlist name. In the example shown in FIG. 7, the music ID "****" has no playlist name.

When the user performs the narrowing operation with the operation part 21 of the UI 2 in order to select playback target music from amongst music stored in the external apparatus 10 (a step S6), the reception part 112 accepts the narrowing operation. The reception part 112 notifies the requestor 114 of the music narrowed by the narrowing operation. Based on the notification, the requestor 114 gives the instruction to play back the music to the external apparatus 10, although this step is not illustrated. The playback signal is sent from the external apparatus 10 in accordance with a playback instruction, and then the playback part 115 performs a playback process.

Moreover, the reception part 112 stores, into the memory 12, the history of the narrowing operation as the history information (a step S7). Further, the reception part 112 notifies the display processor 113 of narrowing operation information. The display processor 113 counts a number of names selectable in each of the category name display area 222a, the artist name display area. 222c, and the album title display area 222d, based on the received narrowing operation information and the database 122 (a step S8). The display processor 113 determines, based on the number of names, whether or not to cause the display change key 223 to be displayed. When the number is two or more, the display processor 113 determines to display the display change key 223. When the number is one or less, the display processor 113 determines not to display the display change key 223.

For example, if the "Genre" is selected as the category name (the narrowing condition) by the narrowing operation, a number of the selectable genre names in the database 122 is counted. The number is two or more, the display processor 113 determines to display the display change key 223 next to the category name display area 222a. For example, when the genre names "Rock" and "Pop" are selectable, the number is two.

If the "Rock" is selected as the genre name by the narrowing operation, a number of selectable artist names is obtained by counting a number of artist names of music categorized as the genre name "Rock," based on the database 122. If the number of the artist names is two or more, the display processor 113 determines to display the display change key 223 next to the artist name display area 222e. Further, if the artist name "AAAA" is selected by the narrowing operation, a number of selectable album titles is obtained by counting a number of the album titles categorized in the selected artist name "AAAA," based on the database 122. If the number of the selectable album titles is two or more, the display processor 113 determines to display the display change key 223 next to the album title display area 222d.

The display processor 113 extracts the category name, the artist name, the album title, and the music title of the playback target music from the database 122 (a step S9). The display processor 113 performs the process of displaying, on the display part 22 of the 2, the extracted names/titles and the display change key 223 determined to be displayed by counting the number of the names/titles (a step S10).

The display process performed by the display processor 113 causes the display part 22 to display the names/titles and the display change key 223 (a step S11). For example, if i) the "genre" "Rock" as the category name, "AAAA." as the artist name, "PPPP" as the album title, and "XXXX" as the song title are extracted, and ii) there are two or more names/titles for each item, the screen 22a shown in FIG. 4 is displayed, as described above. In the case where there is one or less name/title for each item, the display change key 223 is not displayed.

Figure 8:
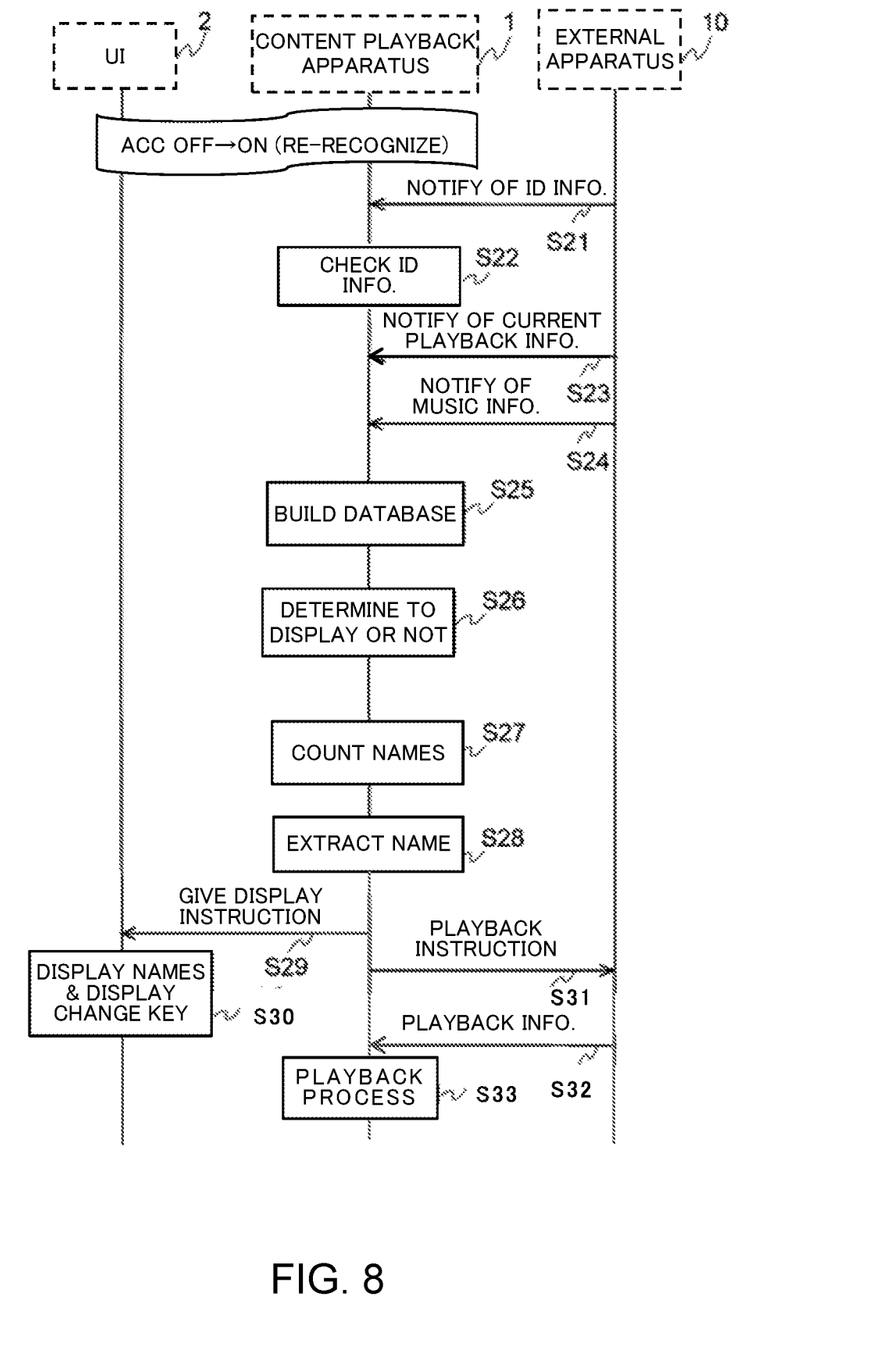
FIG. 8 illustrates a sequence diagram showing a procedure of another process that is performed by the content playback system of this embodiment.

FIG. 8 illustrates a sequence diagram showing a procedure of another process that is performed by the content playback system SYS of this embodiment. FIG. 8 shows a process that is performed when the content playback apparatus 1 changes from a state in which the content playback apparatus 1 fails to recognize the external apparatus 10 to a state in which the content playback apparatus 1 recognizes the external apparatus 10, after the display process of displaying the narrowing condition (category name this embodiment). The narrowing condition can be displayed on the screen 22a by being selected in the narrowing operation. More specifically, FIG. 8 is the sequence diagram showing a process performed when an ACC power of the vehicle is turned on again after being turned off, after the process shown in FIG. 7. The process shown in FIG. 8 may be a process performed, for example, when the external apparatus 10 is reconnected to the content playback apparatus 1 after being disconnected from the content playback apparatus 1.

In this example, since the content playback apparatus 1 and the external apparatus 10 are connected to each other, when the ACC power is turned on, the content playback apparatus 1 and the external apparatus 10 recognize each other. The external apparatus 10 notifies the content playback apparatus 1 of the identification information 121 of the external apparatus 10 (a step S21). The acquisition part 111 of the content playback apparatus 1 performs a check process of checking the received identification information 121. (a step S22). A result of this check process is sent to the display processor 113 of the content playback apparatus 1. Details of the check process will be described later.

Moreover, the external apparatus 10 notifies the content playback apparatus 1 of information of the music (current playback information) being selected in the external apparatus 10 (a step S23). The information includes, for example, the music ID. Further, the external apparatus 10 notifies the content playback apparatus 1 of the music information stored in the memory 102 of the external apparatus 10 (a step S24). The external apparatus 10 notifies the content playback apparatus 1 of the music information of all music that can be played back by the content playback apparatus 1 among the music information stored in the memory 102.

The acquisition part 111 of the content playback apparatus 1 stores, as the database 122 into the memory 12, the music information (the information stored in the memory 102) that the acquisition part 111 received from the external apparatus 10 (a step S25). If the external apparatus 10 is a same device as a device from which the acquisition part 111 has previously received the music information for the database 122, the acquisition part 111 may update the database 122 by storing only a difference from the database 122 previously built. Whether or not the external apparatus 10 is the same device as the device from which the acquisition part 111 has previously received the music information for the database 122 can be determined based on a result of the check process for the identification information in the step S22.

The display processor 113 makes a determination relating to the display process based on the music information of music being selected in the external apparatus 10, the database 122 and the history information 123 previously stored in the memory 12 (a step S26). Details of the determination relating to the display process will be described later. The display processor 113 counts a number of names (a step S27) and extracts the names (a step S28) based on a result of the determination relating to the display process. Then, the display processor 113 gives a display instruction to the display part 22 of the UI 2 (a step S29). Details of this will be described later. The display part 22 displays the names/titles relating to the music and the display change key 223, in accordance with the display instruction (a step S30).

The requestor 114 gives, to the external apparatus 10, the playback instruction of the music being selected in the external apparatus 10 (a step S31). Accordingly, the playback signal is sent from the external apparatus 10 to the content playback apparatus 1 (a step S32), and then the playback part 115 performs the playback process of the music (a step S33).

Figure 9:
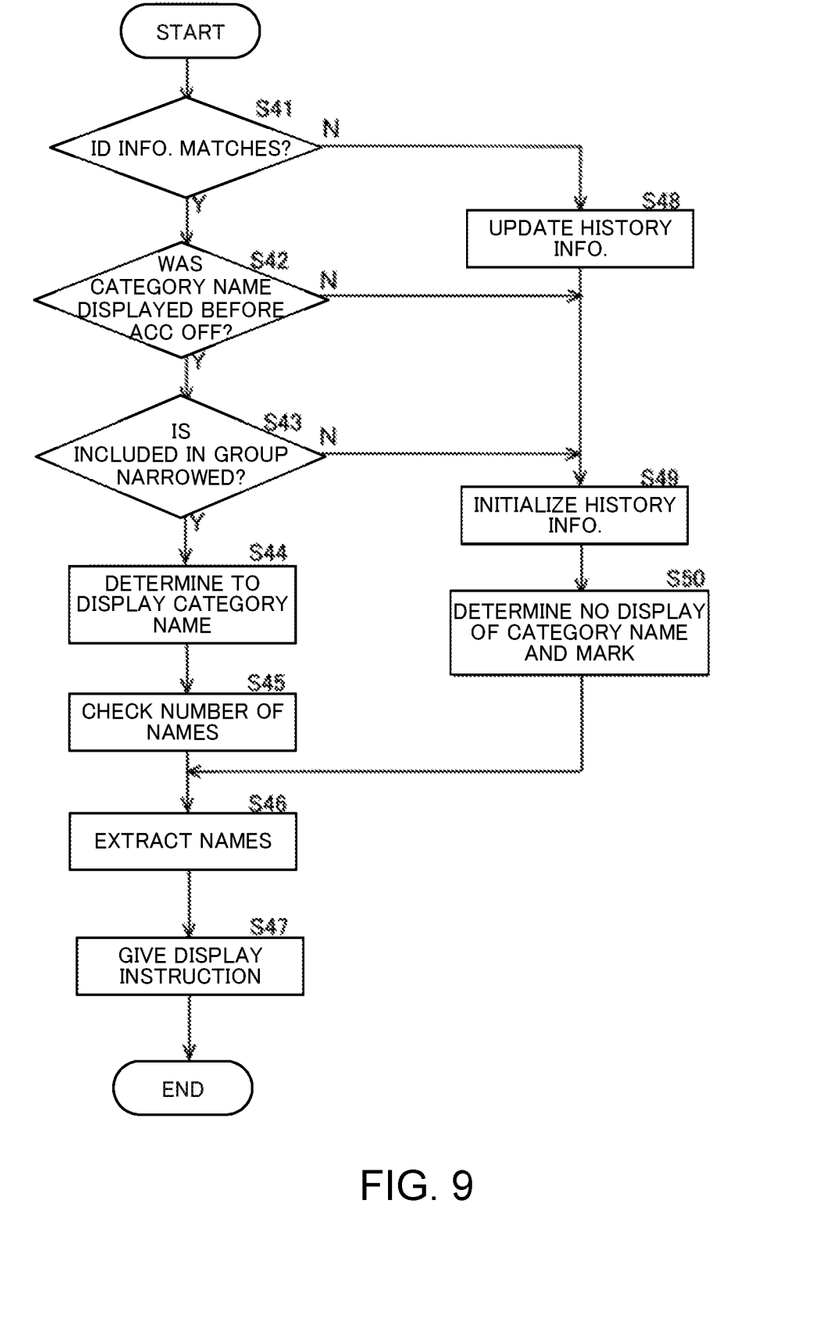
FIG. 9 is a flowchart showing the procedure of the process that is performed by the content playback apparatus of the embodiment.

FIG. 9 is a flowchart showing the procedure of the process that is performed by the content playback apparatus 1 of the embodiment. FIG. 9 shows the process that is performed by the content playback apparatus 1 when the ACC of the vehicle is turned on again after being turned off, after the process shown in FIG. 6 is performed. In other words, FIG. 9 is the steps of the content playback apparatus 1 in the sequence diagram shown in FIG. 8.

The controller 11 of the content playback apparatus 1 checks whether or not the identification information of the external apparatus 10 that the controller 11 currently recognizes (after turning on the ACC power) matches the identification information of the external apparatus 10 recognized immediately before the controller 11 failed to recognize the external apparatus 10 (immediately before turning off the ACC power) (a step S41). In this embodiment, the check is performed by the acquisition part 111.

In a case where the identification information that the controller 11 currently recognizes matches the identification information recognized immediately before the controller 11 failed to recognize the external apparatus 10 (Yes in the step S41), the controller 11 checks, based on the history information 123, whether or not the category name has been displayed on the screen 22a before the controller 11 failed to recognize the external apparatus 10 (a step S42). In this embodiment, this check is performed by the display processor 113.

In a case where the category name has been displayed on the screen 22a before the controller 11 failed to recognize the external apparatus 10 (Yes in the step S42), the controller 11 makes the determination relating to the display process. In this embodiment, the determination is made by the display processor 113.

More specifically, the controller 11 makes the determination, based on the history information 123 and the music information of the music being selected in the external apparatus 10, on whether or not to cause the category name to be displayed on the screen. In other words, in the case where, after the display process of displaying the narrowing condition that can be displayed on the screen 22a by being selected in the narrowing operation, the controller 11 changes from the state in which the content playback apparatus 1 fails to recognize the external apparatus 10 to the state in which the content playback apparatus 1 recognizes the external apparatus 10, the controller 11 determines, based on the history apparatus 10, whether or not to cause the narrowing condition to be displayed on the screen 22a. Thus, the content playback apparatus 1 presumes presence or absence of a user operation made with the external apparatus 10 during the state in which the controller 11 fails to recognize the external apparatus 10, and only in a case where a predetermined condition is satisfied, the narrowing condition, such as the genre name, that can be displayed by being selected by the user can be displayed on the screen 22a.

In this embodiment, the narrowing condition that can be displayed on the screen 22a by being selected in the narrowing operation is the category name that is hierarchically highest information among the hierarchically categorized info ion of the contents. In this embodiment, it is determined whether or not the hierarchically highest information is displayed on the screen 22a. For example, hierarchically lower information, such as a song title, may not be determined whether or not to be displayed on the screen 22a based on the history information 123. In this embodiment, the artist name, the album title, and the music title are displayed based on the information acquired from the external apparatus 10, regardless of the history information 123.

More specifically, the controller 11 determines, based on the database 122, whether or not the music (an example of the contents) being selected in the external apparatus 10 is included in a group narrowed by the narrowing operation in accordance with the history information 123 (a step S43). It is possible to make a speedy determination because the controller 11 uses the database 122 stored in the memory 12 of the controller 11.

For example, if the narrowing operation made in order of the "Genre," the "Rock," the "Artist name," and then the "Album title" is stored as the history information 123, the controller 11 extracts (or derives), from the database 122, a group of music included in the album title narrowed by the narrowing operation. The controller 11 checks whether or not the music being selected in the external apparatus 10 is included in the group of the music extracted. This check may be performed by use of the music ID.

In a case where the music being selected in the external apparatus 10 is included in the group narrowed by the narrowing operation in accordance with the history information 123 (Yes in the step S43), the controller 11 determines to cause the category name to be displayed (a step S44).

Next, the controller 11 checks a number of names/titles selectable in each of the category name display area 222a, the artist name display area 222c and the album title display area 222d, based on the history information 123 and the database 122 (a step S45). A method of counting the number of the names/titles in each of the name display areas 222a, 222c and 222d is same as the method described above. When the number of the names/titles is two or more, the controller 11 determines to cause the display change key 223 to be displayed. When the number of the names/titles is one or less, the controller 11 determines not to cause the display change key 223 to be displayed.

The controller 11 extracts the category name that is stored as the history information 123, and the artist name, the album title and the music title of the music being selected in the external apparatus 10 (a step S46). The artist names and the like of the music being selected in the external apparatus 10 can be extracted from the database 122. The controller 11 performs the process of causing to be displayed on the display part 22 of the UI 2, the extracted names/titles and the display change key 223 determined to be displayed by counting the number of the names and titles (a step S47). Thus, the screen 22a, as shown in FIGS. 4 and 5, for example, having the category name in the category name display area 222a is displayed. In this embodiment, the steps from S45 to S47 are performed by the display processor 113.

According to this embodiment, in the case where music (one example of the contents) being selected in the external apparatus 10 is included in the group of the music narrowed by the narrowing operation in accordance with the history information 123, the controller 11 causes the category name (one example of the narrowing condition) to be displayed on the screen 22a. According to this, only in the case where the controller 11 determines no user operation made with the external apparatus 10 during the state in which the controller 11 fails to recognize the external apparatus 10, the content playback apparatus 1 displays again the category name displayed before the state in which the controller 11 fails to recognize the external apparatus 10. Thus, it is possible to improve usability for the user. In the case where the category name is automatically displayed again, the controller 11 automatically plays back the music narrowed based on the history information 123. For example, in a case where music narrowed based on a playlist 1 was being played back before the state in which the controller 11 failed to recognize the external apparatus 10, once changing to the state in which the controller 11 recognizes the external apparatus 10, the controller 11 starts to play back the music narrowed based on the playlist 1.

Moreover, in this embodiment, the content playback apparatus 1 is configured to determine whether or not to display the category name stored in the history information 123, not by use of the music title (content name) finally narrowed by the narrowing operation based on the history information 123, but by use of the group of the music included in information of a category hierarchical higher (e.g. the album title) than the music title. Therefore, it is possible to presume more accurately presence or absence of the user operation made with the external apparatus 10 during the state in which the controller 11 fails to recognize the external apparatus 10. For example, if i) "XXXX" and "YYYY" are included in a group of the music narrowed by the narrowing operation in accordance with the history information 123, ii) the song "XXXX" was played back before the ACC power was turned off, and iii) the song "YYYY" is being selected in the external apparatus 10 when the ACC power is turned on, the category name is automatically displayed, because it is presumed that the user made no operation to change the category name (narrowing condition) from a time point at which the ACC power was turned off to a time point at which the ACC power was turned on.

The embodiment described above shows an example in which the order of three hierarchical categories the "Genre," the "Artist name," and the "Album title" is stored in the history information 123 for narrowing the contents. However, the hierarchical categories for narrowing the contents stored in the history information 123 may be one or two, for example.

For example, only the "Playlist name" may be stored as the narrowing operation in the history information 123. In this case, the controller 11 extracts, from the database 122, a group of music on the playlist of which a name (e.g. "list 1" shown in FIG. 7) narrowed by the narrowing operation. Then, the controller 11 checks whether or not the music being selected in the external apparatus 10 is included in the group of the music extracted. In a case where the music being selected in the external apparatus 10 is included in the group of the music extracted, the controller 11 causes again the playlist name stored as the history information 123, to be displayed in the category name display area 222a.

As another example, the narrowing operation in order of the "Composer name" and then the "Album title" may be stored as the history information 123. In this case, the controller 11 extracts, from the database 122, a group of music included in the album title narrowed by the narrowing operation. Then, the controller 11 checks whether or not the music being selected in the external apparatus 10 is included in the group of the music extracted. In the case where the music being selected in the external apparatus 10 is included in the group of the music extracted, the controller 11 causes again the composer name stored as the history information 123, to be displayed in the category name display area 222a.

According to this embodiment, when displaying the category name (one example of the narrowing conditions), the controller 11 causes the display change key 223 to be displayed on the screen 22a to show that there is another selectable item, in the case where the controller 11 determines, based on the database 122, that there is another selectable item that can replace the category name displayed. In this embodiment, the display change key 223 is a key to change display. Thus, only in the case where the content playback apparatus 1 determines no user operation made with the external apparatus 10 during the state in which the content playback apparatus 1 fails to recognize the external apparatus 10, it is possible to display not only the category name but also the display change key 223 that shows there is another selectable item besides the currently displayed category name. Therefore, usability for the user can be improved. In this embodiment, the display change key 223 is displayed that shows there is another selectable name/title besides the currently displayed name/title not only for the category name but also for the artist name and the album title (hierarchically lower information than the category name). Thus, usability for the user can be improved further.

In the step S41, in the case where the identification information that the controller 11 currently recognizes does not match the identification information recognized immediately before the controller 11 failed to recognize the external apparatus 10 (No in the step S41), the controller 11 replaces the identification information of the external apparatus 10 stored in the memory 12 with the identification information that the controller 11 currently recognizes (a step S48). Moreover, the controller 11 initializes the history information 123 (a step S49). Further, the controller 11 determines not to display the display change key 223 that shows there are another selectable category name and/or item (a step S50).

In the step S42, in a case where the category name was not displayed on the screen 22a before the controller 11 failed to recognize the external apparatus 10 (No in the step S42), the controller 11 initializes the history information 123 (the step S49) and determines not to display the display change key 223 that shows there are another selectable category name and/or other information (the step S50).

In the step S43, in a case where the music being selected in the external apparatus 10 is not included in the group narrowed by the narrowing operation in accordance with the history information 123 (No in the step S43), the controller 11 initializes the history information 123 (the step S49) and determines not to display the display change key 223 that shows there are another selectable category name and/or other information (the step S50).

After the category name is determined not to be displayed in the step S50, the names are extracted in the step S46. In this case, since no display of the category name has been determined previously, the category name that is stored as the history information 123 is not extracted. The controller 11 extracts, from the database 122, the artist name, the album title and the music title being selected in the external apparatus 10, based on the music ID that the controller 11 receives from the external apparatus 10.

Figure 10:
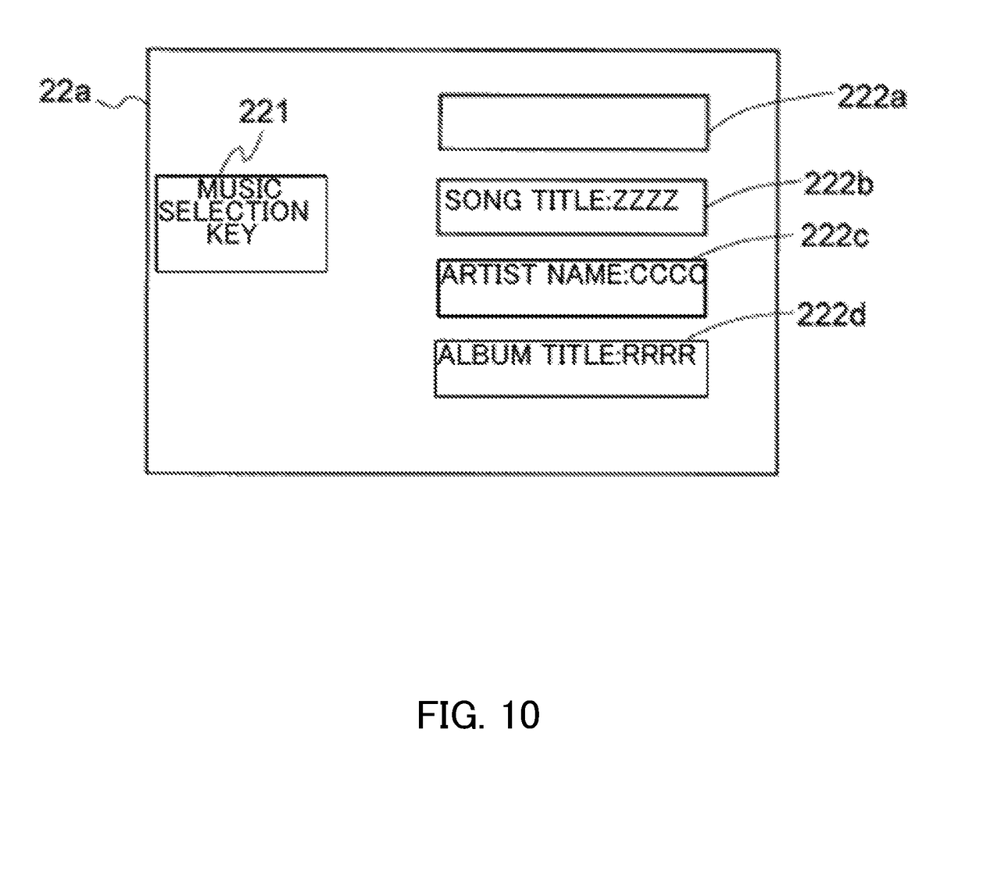
FIG. 10 is an example of the screen displayed when a category name is determined not to be displayed.

Moreover, once the step S46 is performed after the step S50, the display instruction in the step S37 is given. In this case, since the category name and the display change key 223 has been previously determined not to be displayed, the category name and the display change key 223 are not displayed on the screen. 22*a*, as shown its FIG. 10. The artist name, the album title and the song title being selected in the external apparatus 10 are displayed on the screen 22*a*. FIG. 10 is an example of the screen 22*a* displayed when the category name is determined not to be displayed.

According to this embodiment, in the case where the identification information of the external apparatus 10 that the controller 11 currently recognizes does not match the identification information of the external apparatus 10 recognized immediately before the controller 11 failed to recognize the external apparatus 10, the controller 11 does not display the category name (one example of the narrowing condition) on the screen 22*a*. Moreover, in this embodiment, in the case where the music being selected in the external apparatus 10 is not included in the group narrowed by the narrowing operation in accordance with the history information 123, the controller 11 does not to cause the category name to be displayed on the screen 22*a*. Thus, it is possible to prevent the content playback apparatus 1 from giving wrong information to the user when the content playback apparatus 1 fails to presume a user operation made with the external apparatus 10.

<3. Notes>

The configurations of the embodiment and the modifications in this specification are only examples of the invention. The configurations of the embodiment and the modifications may be changed arbitrarily without departing from the scope of the invention. Moreover, the embodiment and the modifications may be arbitrarily combined as far as possible.

For example, in the foregoing embodiment, the controller 11 determines, based on the database 122, whether or not the content being selected in the external apparatus 10 is included in the group narrowed by the narrowing operation in accordance with the history information 123. However, this configuration of the controller 11 is an example. The database 122 may not be used. In other words, the controller 11 may perform a process of storing, into the y 12, list information that is a list of groups of contents narrowed by the narrowing operation. The controller 11 may determine, based on the list information, whether or not a content being selected in the external apparatus 10 is included in the group of contents narrowed by the narrowing operation in accordance with the history information.

For example, in a case where a music is selected by the narrowing operation that selects "Genre," "Rock," "Artist name," and then "Album title" in order, the controller 11 stores, into the memory 12, the list information that is a list of all music included in the album title narrowed by the narrowing operation. When the ACC power is turned off after that process performed by the controller 11, and then the ACC power is turned on again, the controller 11 determines whether or not the music being selected in the external apparatus 10 is the music included in the list information. In the case where the music is included in the list information, the controller 11 determines to display the category name (narrowing condition) included in the history information 123, on the screen 22*a*. According to this modification, the controller 11 makes determination relating to display of the category name without using the database stored in the memory 12.

While the invention has been shown and described in detail, the foregoing description is in all aspects illustrative and not restrictive. It is therefore understood that numerous other modifications and variations can be devised without departing from the scope of the invention.

What is claimed is:

1. A content playback apparatus that plays back a content of a plurality of contents stored in an external apparatus, the content playback apparatus comprising:
   a controller that causes content information of a playback target content among the plurality of contents to be displayed on a screen of the content playback apparatus; and
   a memory that stores information, wherein
   the controller:
      performs a process of storing, as history information into the memory, a history of a narrowing operation performed to select the playback target content;
      performs a process of displaying, on the screen of the content playback apparatus, a narrowing condition on which the playback target content is selected by the narrowing operation;
      determines, based on the history information stored in the memory and the content information of currently selected content of the plurality of contents stored in the external apparatus, whether or not to cause the narrowing condition to be displayed again on the screen of the content playback apparatus, when the playback content apparatus changes from a state in which the content playback apparatus fails to recognize the external apparatus to a state in which the content playback apparatus recognizes the external apparatus;
      causes the narrowing condition to be displayed again on the screen of the content playback apparatus when the currently selected content of the external apparatus is included in a group of the playback target contents narrowed by the narrowing operation in accordance with the history information; and
      causes the narrowing condition to not be displayed on the screen of the content playback apparatus when the currently selected content of the external apparatus is not included in a group of the playback target contents narrowed by the narrowing operation in accordance with the history information.

2. The content playback apparatus according to claim 1, wherein
   the controller:
      performs a process of acquiring the content information stored in the external apparatus, and storing the acquired content information, as a database, into the memory; and
      determines, based on the database, whether or not the currently selected content is included in the group of the playback target contents narrowed by the narrowing operation in accordance with the history information.

3. The content playback apparatus according to claim 1, wherein the controller:
performs a process of storing, into the memory, list information that is a list of the group of the playback target contents narrowed by the narrowing operation; and
determines, based on the list information, whether or not the currently selected content is included in the group of the playback target contents narrowed by the narrowing operation in accordance with the history information.

4. The content playback apparatus according to claim 1, wherein the controller:
performs a process of acquiring the content information stored in the external apparatus, and storing the acquired content information, as a database, into the memory; and
when the controller determines that there is another item to which the narrowing condition can be changed, when causing the narrowing condition to be displayed, causes a mark to be displayed on the screen of the content playback apparatus, the mark showing that there is the another item that is selectable, the narrowing condition being displayed based on the database.

5. The content playback apparatus according to claim 1, wherein identification information of the external apparatus being connected to the content playback apparatus is stored in the memory, and
when the identification information of the external apparatus that the controller currently recognizes does not match the identification information of the external apparatus recognized immediately before the controller failed to recognize the external apparatus, the controller does not cause the narrowing condition to be displayed on the screen of the content playback apparatus.

6. The content playback apparatus according to claim 1, wherein the content information to be displayed on the screen of the content playback apparatus includes a plurality of sorts of hierarchically categorized information, and
the narrowing condition is hierarchically highest information among the hierarchically categorized information of the content.

7. The content playback apparatus according to claim 1, wherein the narrowing condition includes a plurality of selectable conditions, and
the plurality of selectable conditions includes at least one of a genre name, a composer name and a playlist name of the content, the playlist name being a name of a playlist that is a list of the contents prepared by a user to define an order of playing back the contents.

8. A method of controlling a content playback apparatus that plays back a content of a plurality of contents stored in an external apparatus, the method comprising the steps of:

causing, by a controller of the content playback apparatus, content information of a playback target content among the plurality of contents to be displayed on a screen of the content playback apparatus;
storing into the memory, by the controller, history information including a history of a narrowing operation performed to select the playback target content;
displaying, by the controller, on the screen of the content playback apparatus, a narrowing condition on which the playback target content is selected by the narrowing operation;
based on the history information stored in the memory and the content information of currently selected content of the plurality of contents stored in the external apparatus, determining, by the controller, whether or not to cause the narrowing condition to be displayed again on the screen of the content playback apparatus, when the playback content apparatus changes from a state in which the content playback apparatus fails to recognize the external apparatus to a state in which the content playback apparatus recognizes the external apparatus;
causing the narrowing condition to be displayed again on the screen of the content playback apparatus when the currently selected content of the external apparatus is included in a group of the playback target contents narrowed by the narrowing operation in accordance with the history information; and
causing the narrowing condition to not be displayed on the screen of the content playback apparatus when the currently selected content of the external apparatus is not included in a group of the playback target contents narrowed by the narrowing operation in accordance with the history information.

* * * * *